United States Patent [19]

Scovell

[11] Patent Number: 5,094,744
[45] Date of Patent: Mar. 10, 1992

[54] OIL SPILL RECOVERY APPARATUS

[76] Inventor: Vern R. Scovell, 35800 12th St., Nehalem, Oreg. 97131

[21] Appl. No.: 620,260

[22] Filed: Nov. 30, 1990

[51] Int. Cl.$^5$ .............................................. E02B 15/04
[52] U.S. Cl. ...................................... 210/242.3; 210/923
[58] Field of Search ..................... 210/242.3, 776, 923, 210/541

[56] References Cited

U.S. PATENT DOCUMENTS

| | | | |
|---|---|---|---|
| 3,348,690 | 10/1967 | Cornelissen | 210/923 |
| 3,612,280 | 10/1971 | Fitzgerald et al. | 210/242.3 |
| 3,653,510 | 4/1972 | Fitzgerald | 210/242.3 |
| 3,684,095 | 8/1972 | Ayers | 210/242.3 |
| 3,737,040 | 6/1973 | Brydoy et al. | 210/242.3 |
| 3,771,662 | 11/1973 | Muramatsu et al. | 210/923 |
| 3,966,615 | 6/1976 | Petchul et al. | 210/776 |
| 3,983,034 | 9/1976 | Wilson | 210/242.3 |
| 4,209,400 | 6/1980 | Mayes | 210/242.3 |
| 4,388,188 | 6/1983 | Morris | 210/923 |
| 4,554,070 | 11/1985 | Jordan | 210/242.3 |
| 4,597,863 | 7/1986 | Rymal, Jr. | 210/923 |
| 4,673,497 | 6/1987 | Lundin | 210/923 |
| 4,959,143 | 9/1990 | Koster | 210/242.3 |
| 4,963,272 | 10/1990 | Garrett | 210/242.3 |

Primary Examiner—Stanley S. Silverman
Assistant Examiner—Christopher Upton

[57] ABSTRACT

An oil skimming apparatus is provided for collecting oil from the surface of a body of water. The apparatus may be retrofitted to a standard ocean going vessel. The vessel tows a U-shaped boom comprised of a floating oil boom on each side of the vessel and a U-shaped vertical apron aft of the stern of the vessel. A vertical weir is provided forward of the apron to create an enclosed region where oil may collect. A floating pump intake is tethered within the collection region with a pump transferring oil from the intake to tanks within the vessel. A rigid ramp extends an angle downwardly from the stern of the vessel to the lower edge of the apron. The lower edges of the apron and the weir are sealed to the surface of the ramp providing an enclosed containment region. Rigid side skirts extend downwardly along each side of the ramp to form a deflection means for diverting turbulence and boat wake beneath and beyond the collection region.

10 Claims, 3 Drawing Sheets

5,094,744

OIL SPILL RECOVERY APPARATUS

TECHNICAL FIELD

This invention relates to a system for removing oil spilled on the surface of water, and more particularly to a system which may be rapidly deployed to locations where oil may have been spilled during loading, unloading, or transportation accidents.

BACKGROUND ART

Oil recovery systems exist that incorporate a floating boom type collection apparatus. In the usual floating boom apparatus, each end of a U-shaped boom is drawn forward through the spill area and the floating oil is collected at the rear, closed end of the boom, wherefrom it can be recovered. This type of system generally requires three vessels to operate, one towing each of the front ends and one at the rear end to collect the oil. An example of such an oil recovery system is disclosed by U.S. Pat. No. 4,388,188. A three vessel system is costly to operate, requires time to deploy and requires difficult coordinated navigation while in operation. In addition, a three vessel system is ineffective in rough weather where heavy seas may move the vessels relative to one another, resulting in a failure of the oil boom. The deployment time is especially critical in cases involving spills that can be easily contained only in the earliest stages before substantial spreading has occurred.

Single vessel operated oil recovery systems are known, as in U.S. Pat. No. 3,771,662, in FIG. 1-B. However, known single vessel systems tow the containment boom immediately behind the vessel. As a result, the turbulence and increased water flow behind the propeller of the vessel makes recovery difficult by mixing oil and water in the containment area and by churning some of the oil to depths where containment is not possible.

Another disadvantage of known single vessel recovery systems is the difficulty of keeping the front of the boom open to a sufficient width to enable a large area of water to be skimmed. A vessel whose recovery zone is narrower than the width of the boat, such as disclosed in U.S Pat. No. 4,597,863, is useful only for very small spills in very small areas. Minor improvements have been achieved as by extending oil collection booms from the sides of the vessels as in U.S. Pat. No. 4,673,497, to divert oil to collection ports in the vessel's sides, but such options are not useful for large spill areas. Larger spill areas may be skimmed by dedicated vessels with large containment booms, such as disclosed in U.S. Pat. No. 3,348,690, but such systems are not easily and rapidly adaptable to ordinary ocean-going vessels, such as those that might be in the vicinity and therefore capable of a rapid response.

SUMMARY OF INVENTION

It is an object of the present invention to provide an apparatus for collecting spilled oil, which may be operated from a single vessel.

A further object of the present invention is to reduce the adverse effects of turbulence, which otherwise impairs the ability of a single vessel system to collect oil in its wake.

It is yet another object of the invention to provide a single vessel recovery apparatus that skims a wide path.

It is yet another object of the invention to provide a system that may be easily adapted and retrofitted to large ocean-going vessels having rear loading ramps, such as commercial fishing vessels.

The invention achieves these and other objects by providing an apparatus for recovering oil spilled on a water surface where the apparatus can be mounted to a vessel and includes means for gathering spilled oil into a small area to the rear of the vessel with means for pumping the gathered oil into storage tanks on the vessel. The apparatus also has means for diverting the turbulent flow from the vessel's propeller away from the containment area.

DETAILED DESCRIPTION OF A PREFERRED EMBODIMENT

Figure 1:
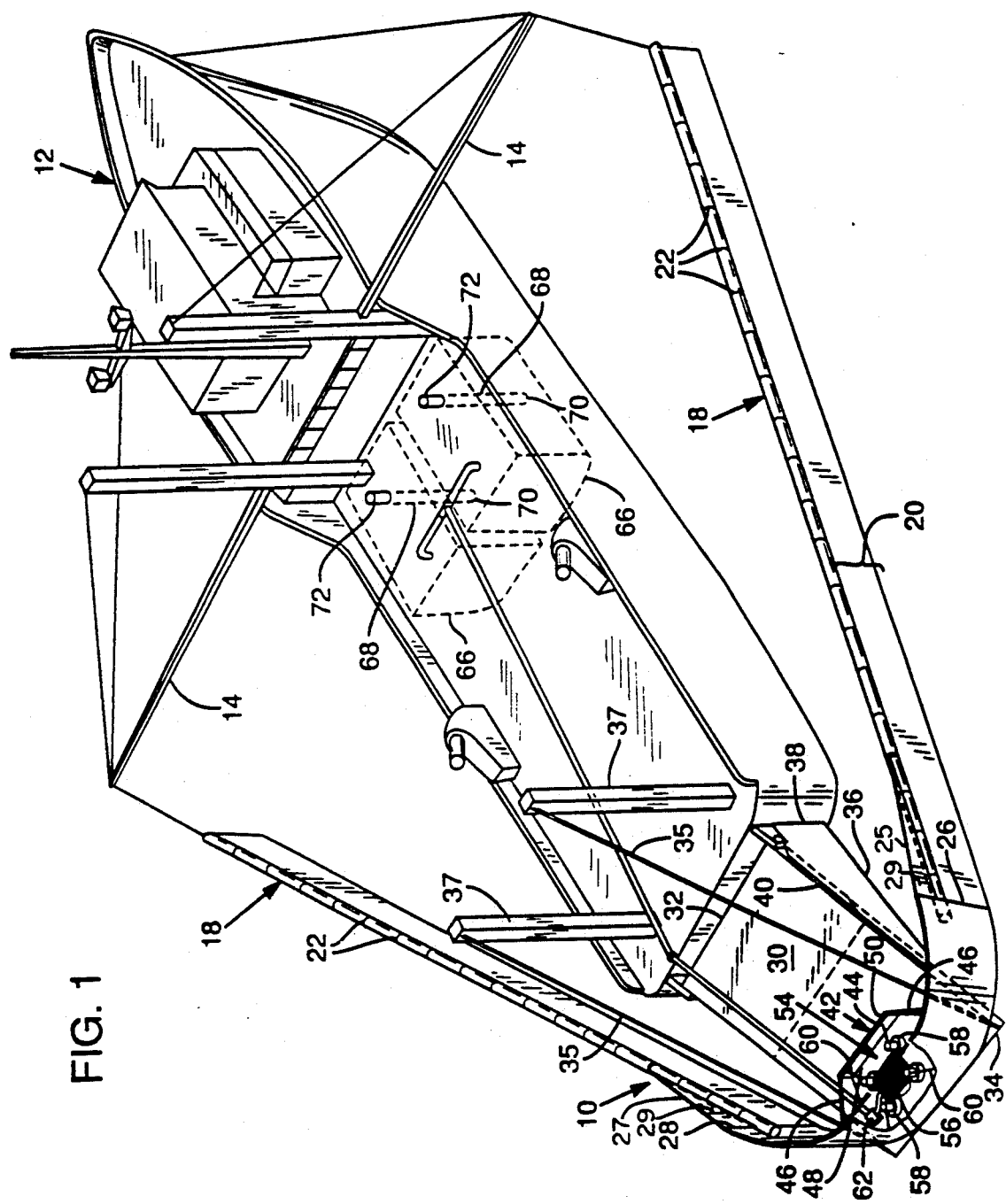
FIG. 1 is a perspective view of an apparatus constructed in accordance with the invention.

Referring to the drawings, FIG. 1 illustrates an oil spill recovering apparatus 10 constructed in accordance with the invention as a retrofit installation on an ocean going vessel 12. A pair of extension booms 14 extend laterally from opposite sides of the vessel whereby the outward ends of the extension booms are widely spaced, forming boom spreading means. A pair of floating oil booms 18 are each attached at their front ends to the outward ends of the extension booms and extend rearwardly therefrom. The oil booms may be provided with additional attachment means (not shown) for securing the boom at a restricted distance from the vessel, the attachment means preferably comprising a plurality of cables connecting the vessel to spaced-apart points at intermediate locations on the booms.

The floating oil booms are flexibly compliant to the water surface and extend substantially above and below the water surface, preferably extending about two feet above and about three feet below the surface. Each floating oil boom includes a line of lightweight, airfilled cylinders preferably three to five feet long and preferably one to two feet diameter, with a fabric boom skirt 20 depending vertically and downwardly therefrom, the cylinders being closely connected end-to-end at hinged connections 22 permitting flexure of the boom. The fabric skirt hangs vertically below the cylinders to a depth of about three feet and is sealably attached thereto.

The floating oil booms 18 are attached at their rear ends to the ends of a U-shaped rigid vertical containment apron 24 positioned aft of the stern of the vessel 12 and extending generally parallel to the stern surface, the oil booms and apron together forming a U-shaped boom and apron assembly or oil gathering means, the containment apron forming the center portion thereof. The containment apron preferably has a surface of steel plate on the concave side towards the vessel, and forms a vertical wall preferably extending at least four feet above and below the water surface. The apron is preferably constructed of separable sections bolted together with rubber gaskets (not shown) therebetween to provide a watertight seal. The apron has a right edge 26 and a left edge 28, each edge being connected to the rear end of the respective floating oil boom 18, each edge of the apron also being provided with a rubber bumper to reduce wear of the floating oil boom, and each edge being overlapped by the fabric skirt 20 of the oil boom, whereby a watertight seal is formed therebetween.

A first apron cable 25 and a second apron cable 27 are provided for further securing the apron 24 to the oil booms 18. The first apron cable has a rear end attached to the upper corner of the apron at the right edge 26. A forward end of the first apron cable is attached to the upper edge of the corresponding oil boom 18 at a location forwardly removed from the apron, preferably about 20 feet forward of the right edge of the apron. Similarly, the second apron cable has a rear end attached to the upper corner of the apron at the left edge 28. A forward end of the second apron cable is attached to the upper edge of the corresponding oil boom 18 at a location forwardly removed from the apron, preferably about 20 feet forward of the left edge of the apron. A right fabric panel 29 is provided to prevent flow over the oil boom. The right fabric panel is attached to the first apron cable 25, the upper portion of the right edge 26 of the apron and the corresponding oil boom 18 and seals off the triangular region bounded by these elements. Similarly, the left fabric panel seals off the triangular region bounded by the second apron cable 27, the upper portion of the left edge 28 of the apron and the corresponding oil boom 18.

The containment apron 24 is sealed at its lower edge to a rigid ramp 30 The ramp is a rectangular, rigid steel plate having a front edge 32 which is hingedly attached to the top of the stern of the vessel 12 about three feet above the water surface. The ramp slopes downward on a slope similar to a boat ramp slope, preferably at an angle of about 15° from the horizontal to a rear edge 34 of the ramp, which is suitably bolted and sealed to the lower edge of the containment apron 24 along the length of the rear edge of the ramp at a depth of about four feet below the water surface or water line. The ramp is preferably about 25 feet wide and preferably extends about 30 feet behind the rear of the vessel. The ramp is supported at its rear edge corners by support cables 35 extending rearwardly and downwardly from the tops of a pair of vertical ramp support masts 37 positioned at opposite corners of the stern of the vessel. The masts are separated by a distance generally equal to the width of the ramp. Suitable winch means (not shown) are provided for taking in or letting out the support cables whereby the ramp 30 may be raised or lowered.

A pair of rigid, vertical steel-surfaced side skirts 36 depend downwardly from the edges of the ramp 30. The front edge 38 of each skirt abuts the stern of the vessel from a point about 2 feet above the water surface to a point about three feet below the water surface. A rubber gasket (not shown) is preferably affixed to the front edge 38 of each skirt to effect a watertight seal between each skirt and the vessel stern surface. Each side skirt has a top edge 40 fixedly attached by suitable means such as bolts to a side edge of the ramp 30, the side skirts extending rearward to the rear edge 34 of the ramp. The ramp and skirts together form turbulence deflection means for deflecting the vessel wake and propeller turbulence underneath and rearwardly of the ramp.

A rigid, steel-surfaced containment weir 42 is formed in separable sections with a center section 44 defining a vertical wall parallel to and about seven feet forward of the center of the containment apron 24. The weir has two side panels 46, which are inclined outwardly at an angle of about 45° from the plane of the center section 44. The center section 44 and side panels 46 are bolted together with suitable rubber gaskets (not shown) to make the joints watertight. The lower edge 48 of the weir conforms to and is sealed to the ramp 30 by means of rubber gaskets (not shown), the weir being suitably bolted to the ramp so that it can be easily assembled and disassembled. The distal edges of the side panels of the weir are sealably attached by bolting with a rubber gasket to the containment apron 24. The upper edge 50 of the weir is horizontal and preferably 2 to 6 inches below the water surface and two feet above the ramp.

A containment pool 54 of approximately 3000 gallon capacity and open only at its top is thereby formed with the ramp 30 forming its bottom, the apron 24 forming its rear wall, and the weir 42 forming its front and side walls. Additional bracing (not shown) may be provided to strengthen the apron and weir.

Figure 2:
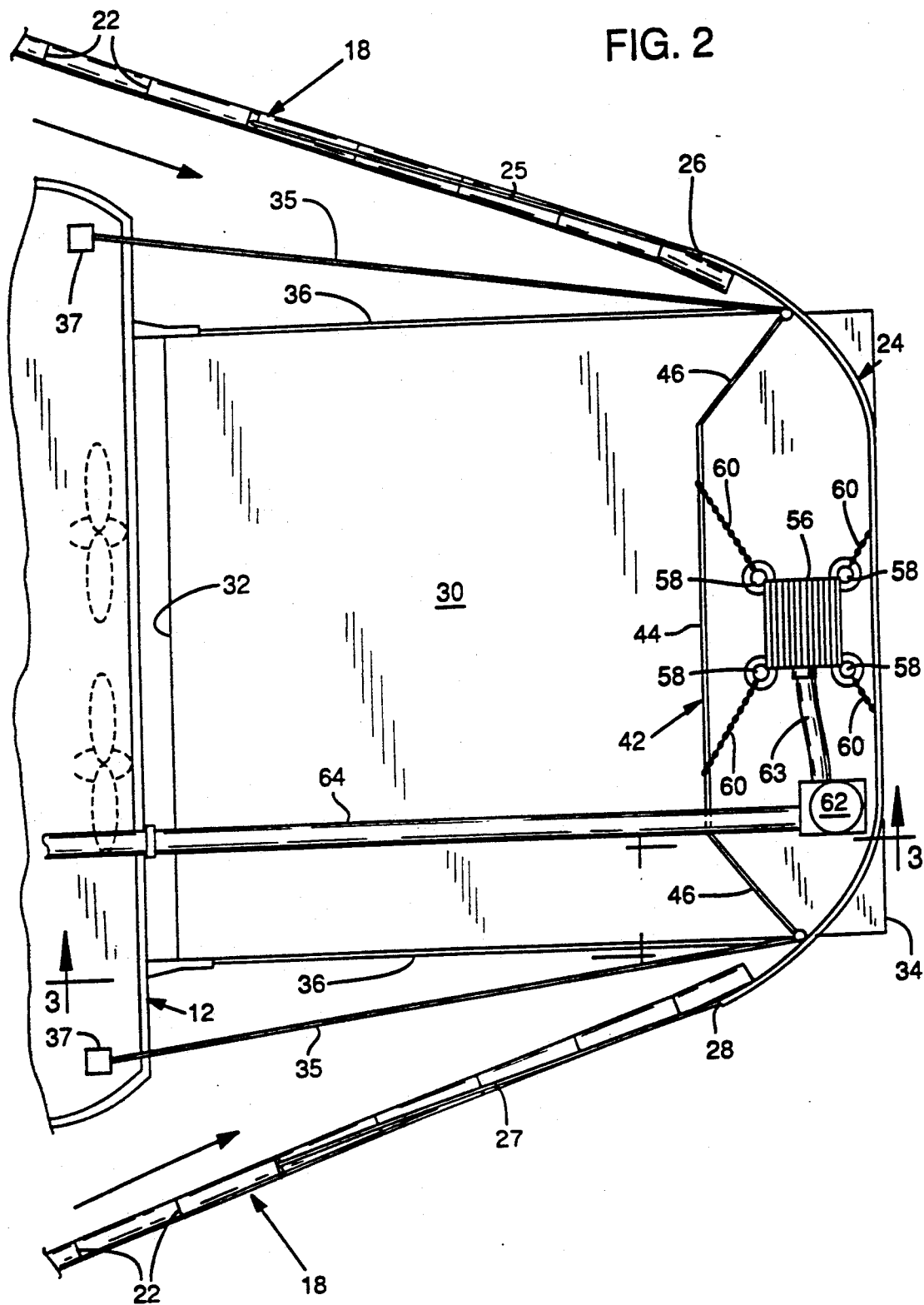
FIG. 2 is an enlarged plan view of the rear portion thereof.
Figure 3:
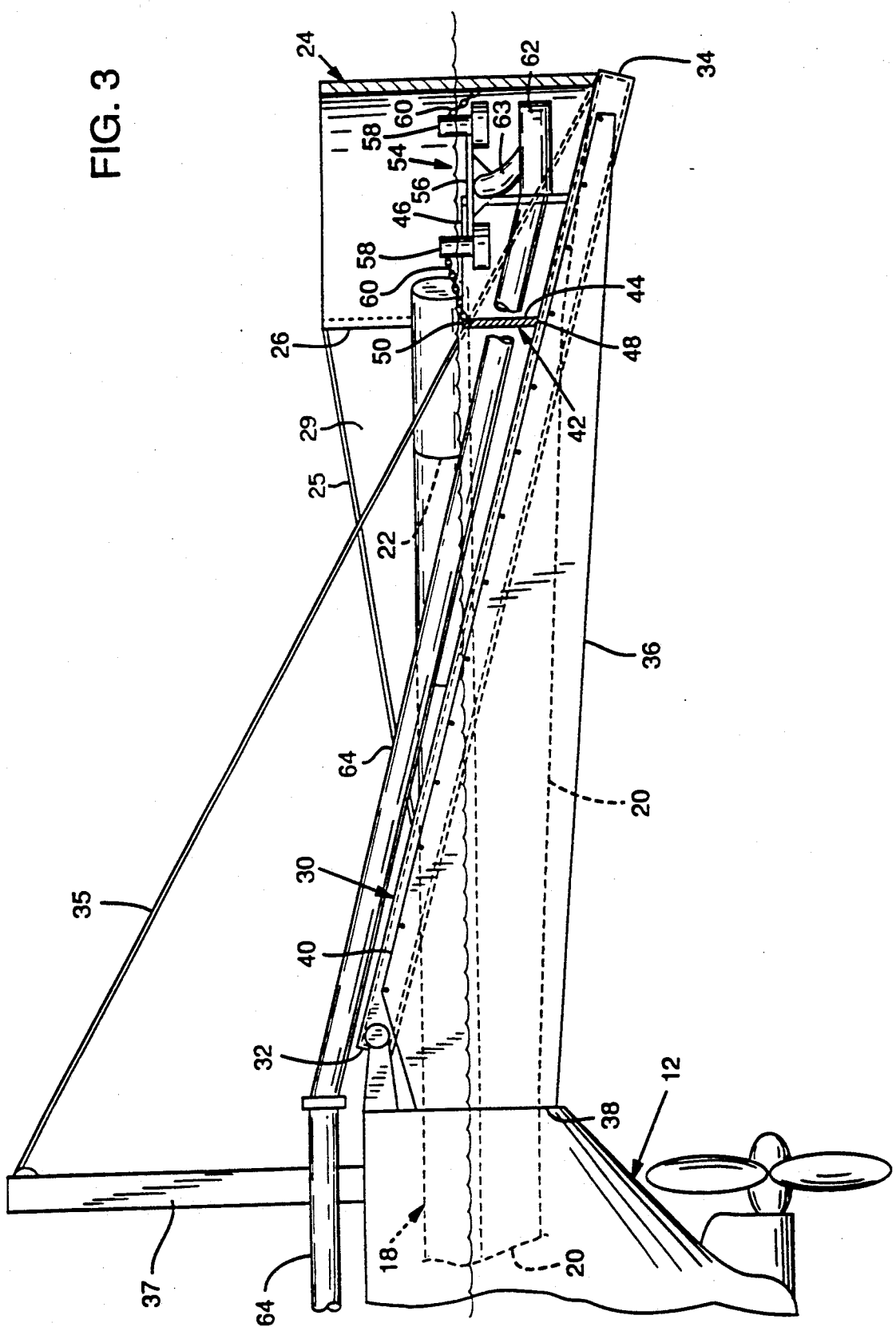
FIG. 3 is a sectional view taken along line 3—3 of FIG. 2.

Means are provided for pumping oil from the containment pool 54 to storage tanks 66 located in the hold of the vessel 12. Referring to FIGS. 2 and 3, located within the containment pool 54 between the apron 24 and the weir 42 is a rectangularly shaped pump intake 56 which is positioned at a depth slightly below the water surface by floatation means 58 positioned at the corners of the pump intake. The pump intake preferably includes a removable trash gate to prevent debris from entering the intake. The pump intake is maintained at a location within the containment pool by four pump anchor chains 60. The pump anchor chains are attached to the corners of the pump intake and extend radially in tension, two chains being attached to widely spaced points on the weir 42, and two chains being attached to widely spaced points on the apron 24 whereby the pump intake follows the surface of rising and falling waves.

Submersible electric or hydraulic pump means 62 located in the containment pool 54 and fixed to the ramp 30 adjacent to and in communication with the pump intake, preferably via a non-collapsible suction hose 63, is provided for drawing in fluid at pump intake 56 and transferring it through a conduit 64 capable of transferring fluids under pressure to the oil storage tanks 66. Alternatively, the pump means may be driven by a motor above the water with a shaft in communication with the pump. The suction hose preferably has sufficient length whereby the pump intake is not restricted from substantial vertical displacement to accommodate wave height changes.

The conduit 64 passes through a sealed and gasketed hole in the weir 42, the conduit preferably being split and valved to fill the storage tanks 66 evenly, thereby maintaining a balanced load in the vessel and a reduced velocity of the flow entering the tanks. Each tank preferably includes a vertical outlet pipe 68 having a lower opening 70 within the tank near the bottom of the tank and an upper end 72 for discharging excess water from the tank to an overflow area (not shown) as the oil is pumped into the tank. The conduit and overflow pipes are preferably provided with watertight valves (not shown) for selectively sealing off the tanks.

OPERATION

The oil spill recovery apparatus is operated by navigating the vessel 12 through an oil spill area. The surface oil is captured between the front ends of the floating booms 18 and is concentrated in the rear of the U-shaped apparatus is the vessel 12 advances. Because the oil is floating on the surface, it passes over the upper edge 50 of the weir 42 and into the containment pool 54. The increased thickness of the oil layer within the containment pool permits the pump intake 56 to collect oil from the surface of the pool with a minimum of water included in the collected mixture. The collected oil is then pumped into the oil storage tanks 66 on the vessel.

In the foregoing it will be apparent that the described oil spill recovery system is capable of skimming wide areas while requiring only a single vessel. Thus, it enjoys the advantages of rapid deployment, easy navigation, and a reduced operating cost. The ramp 30 and skirts 36 divert the propeller turbulence away from the oil containment pool, where a calm surface within the pool open enables more effective oil recovery. Moreover, the skimming apparatus may be stored in a disassembled condition when not needed so that the vessel may be used for other activities. Should a spill occur, the oil recovery apparatus may be rapidly assembled and the vessel utilized to collect the spilled oil whereafter the apparatus may be disassembled and stored aboard the vessel until once again needed.

Having illustrated and described the principles of my invention by what is presently a preferred embodiment, it should be apparent to those persons skilled in the art that the illustrated embodiment may be modified without departing from such principles. I claim as our invention not only the illustrated embodiment but all such modifications, variations and equivalents thereof as come within the true spirit and scope of the following claims.

I claim:

1. An apparatus for recovering spilled oil on a water surface, the apparatus comprising:
   a vessel having a propulsion system including a propeller positioned at the vessel stern and having oil storage tanks for storing recovered oil and water, the vessel having a pair of extension booms, each extension boom being rigidly attached to and extending outwardly from the mid-section of the vessel on opposite sides;
   a pair of floating booms, each floating boom having a front end and a rear end, the front ends being connected to the respective extension boom' outward ends, the floating booms extending rearward of the vessel stern and being flexibly compliant to the water surface, the floating booms extending above and below the water surface;
   a U-shaped containment apron forming a vertical wall, the apron having an upper edge positioned substantially above the water line and a lower edge positioned substantially below the water line, the apron also having two ends, each end being attached to the rearward end of one of the floating booms, whereby a U-shaped boom and apron assembly is formed;
   a turbulence deflection ramp having a front edge positioned above said propeller, two side edges along the length of the ramp, and a rear edge, the front edge being attached at a horizontal line at the rear of the vessel, the ramp extending rigidly and rearwardly downward so that the rear edge is located below the water surface, the rear edge being sealably attached to the lower edge of the containment apron;
   a pair of side skirts fixed one to each and extending downwardly from a side edge of the ramp along its length, the skirts extending substantially below the water surface;
   a containment weir having an upper weir edge, a lower weir edge, and two side weir edges, the containment weir being located forward of the containment apron, the lower weir edge being sealably attached to the ramp at a location below the water surface, the side weir edges being sealably attached to the containment apron, the upper weir edge being parallel to and slightly below the water surface, whereby a containment pool is formed with the apron and weir forming its sides and the ramp forming its bottom; and
   pump means operatively arranged with the containment pool and the vessel for removing fluid from the surface of the containment pool to the oil storage tanks on the vessel.

2. A system for recovering spilled oil on a water surface, the system residing on a single vessel including a propulsion system having an underwater propulsion means at the stern of the vessel and comprising:
   oil gathering means operatively connected to said vessel for gathering spilled oil into a small containment area, at least a portion of which is directly astern of the vessel while the vessel is propelled forwardly;
   pump means for transferring gathered oil from the containment area into the vessel; and
   a turbulence deflection member connected to said vessel, constructed and arranged to divert the water flow and turbulence from the vessel's propulsion system away from the containment area.

3. The system of claim 2 wherein the turbulence deflection member diverts the water flow and turbulence to a point to the rear of the vessel below and beyond the containment area.

4. The system of claim 2 wherein the pump means includes a floating pump intake tethered within the containment area.

5. The system of claim 2 wherein the vessel has boom spreading means for towing the oil gathering means from two widely spaced points, whereby a wide path may be skimmed by the system.

6. A system mounted to a vessel having a propulsion system for recovering spilled oil on a water surface and comprising:
   oil gathering means for gathering spilled oil into a mall containment area behind the vessel while the vessel is propelled forwardly;
   pump means for transferring gathered oil from the containment area into the vessel; and
   turbulence deflection means for diverting the water flow and turbulence from the vessel's propulsion system away from the containment area to a point to the rear of the vessel below and beyond the containment area wherein the turbulence deflection means comprises a ramp attached to the rear of the vessel at a location above the vessel's propulsion system, the ramp extending angularly downwardly and beneath the containment area.

7. The system of claim 6 wherein the turbulence deflection means includes side skirts extending downward from the side edges of the ramp, whereby turbulent flow is substantially prevented from escaping from below the ramp.

8. The system of claim 6 wherein the oil gathering means has an upper edge above the surface of the water, and a lower edge below the surface of the water.

9. The system of claim 8 wherein the oil gathering means has a center portion aft of the stern of the vessel, the center portion having a lower edge attached and sealed to the ramp, whereby water and oil are substantially prevented from escaping the containment area.

10. The system of claim 8 wherein the oil gathering means includes a containment weir forming a vertical wall in front of the rearmost portion of the oil gathering means, the weir having a top edge located below the water surface, distal side edges attached to distally located positions on the center portion of the oil gathering means, and a lower edge attached to the ramp, whereby is formed a containment pool from which fluid cannot easily escape.

* * * * *